Patented Oct. 25, 1949

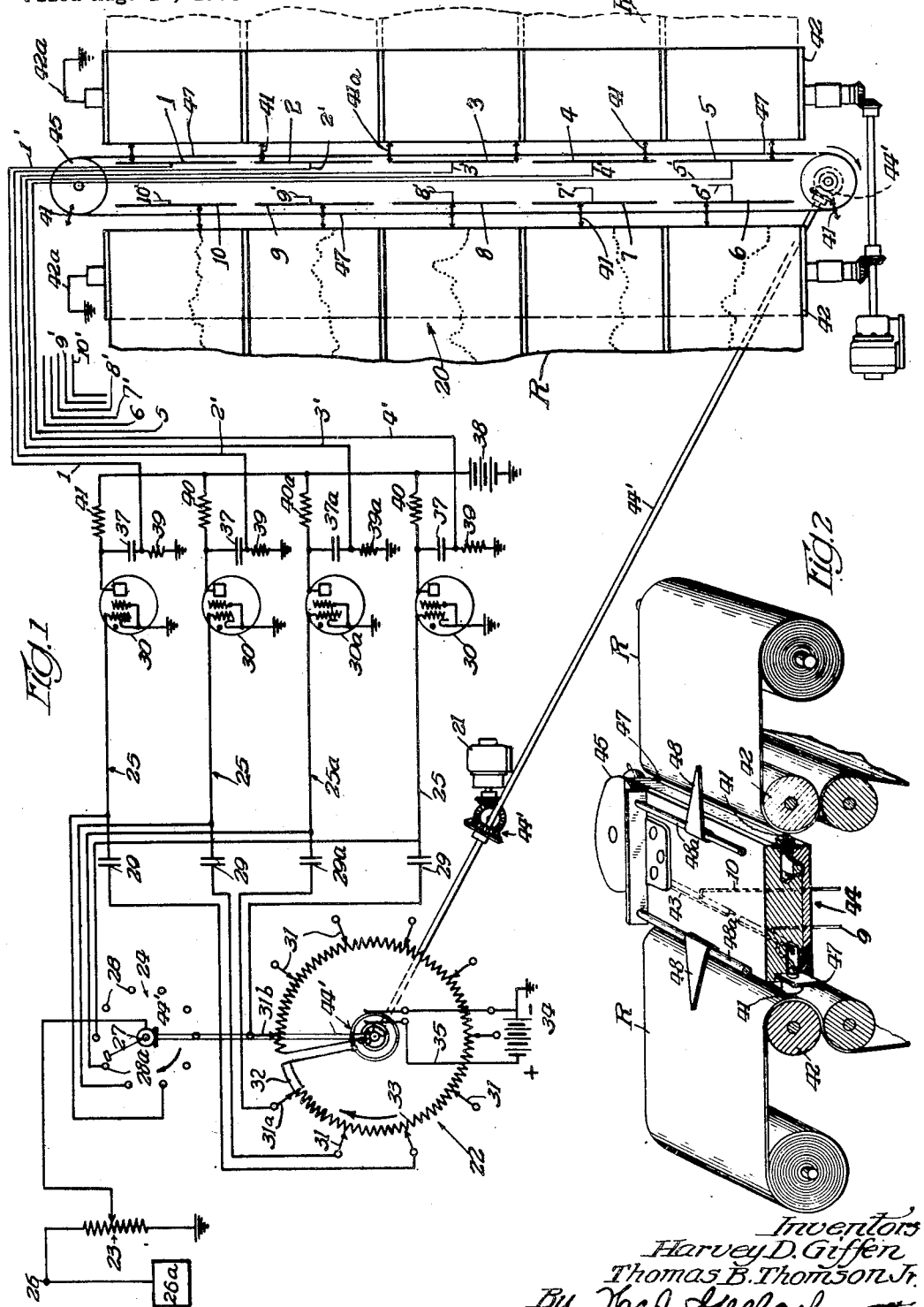

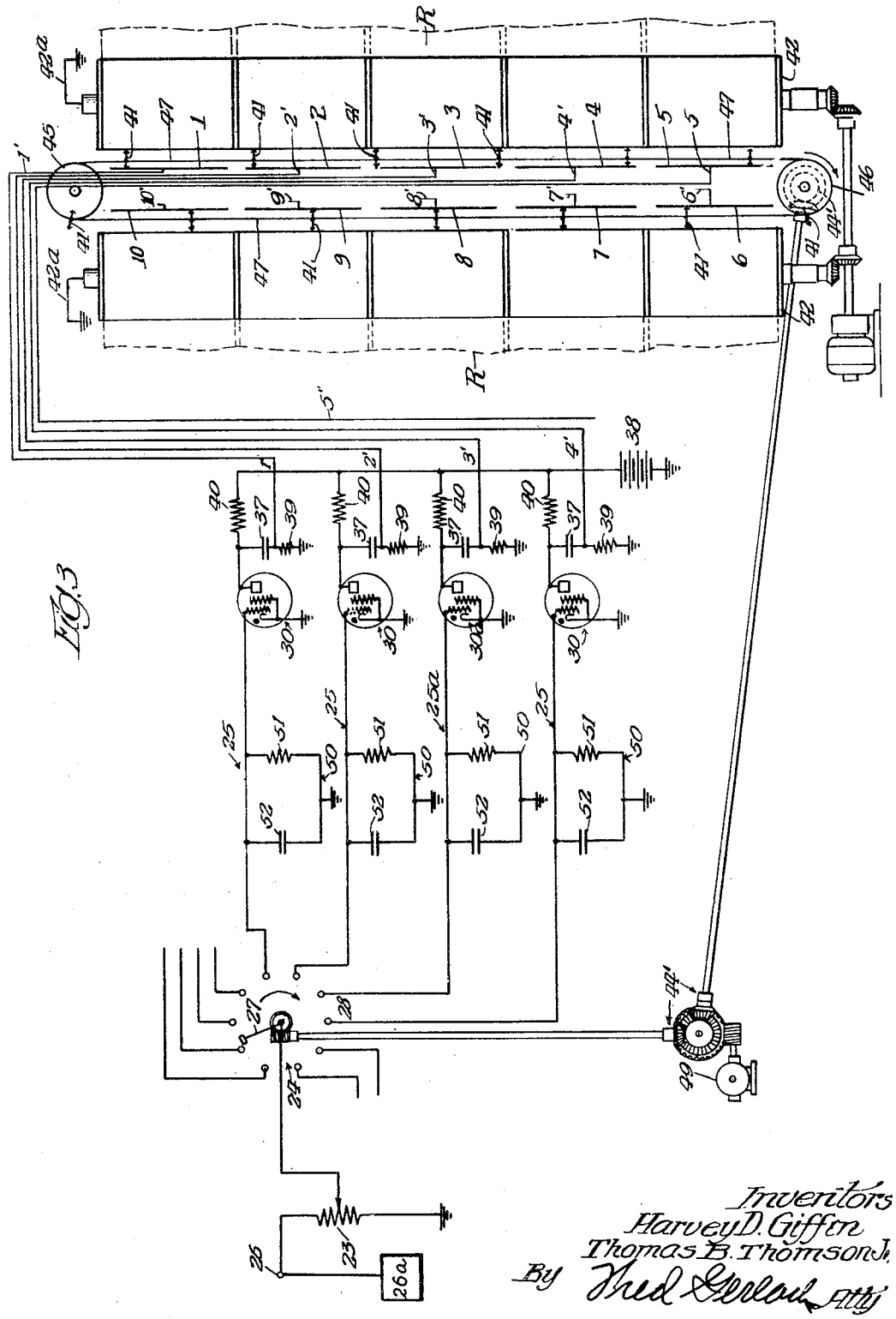

2,485,730

UNITED STATES PATENT OFFICE 2,485,730

RECORDING APPARATUS FOR TELEMETRIC SYSTEMS

Harvey D. Giffen, Theodore, Ala., and Thomas B. Thomson, Jr., San Diego, Calif., assignors to Consolidated Vultee Aircraft Corporation, San Diego, Calif., a corporation of Delaware Application August 14, 1944, Serial No. 549,441

20 Claims. (346—33)

This invention relates to an apparatus for recording data received from a plurality of sources, as, for example, in a telemetric system. The preferred form of our invention herein disclosed is particularly adapted for use in a telemetric system of the type disclosed in our copending application Serial No. 549,440, filed Aug. 14, 1944.

An object of the present invention is to provide a new and improved recording apparatus for analyzing and recording signals received from a plurality of different sources.

Another object of the present invention is to provide novel apparatus for graphically recording data representing changes in a plurality of gauges.

Another object of the present invention is to provide a novel form of graphic recording apparatus wherein data received from a plurality of sources and over a single channel are plotted on separate record sheets to provide a plurality of curves.

Another object of the present invention is to provide in a novel form of recording apparatus, means for storing a potential, the duration of which is extremely short, for a period of time sufficient to permit its value to be determined and to permit a marking element to move along a defined path and to effect an indication at a point related to the value of the stored potential.

Another object of the present invention is to provide in a recording apparatus a novel mechanism for marking record sheets.

Another object of the present invention is to provide in a recording apparatus adapted to plot on separate record sheets the changes in a plurality of gauges and marking devices arranged to register successively on successive record sheets, and with each registration on each of the various record sheets providing an indication of the condition of the gauge associated with that record sheet.

Other objects and advantages will become readily apparent from the following detailed description taken in connection with the accompanying drawings wherein:

Fig. 1 is a diagrammatic representation of a preferred form of the invention.

Fig. 2 is a perspective view of a portion of an apparatus embodying the preferred form of the invention.

Fig. 3 is a diagrammatic representation of a modified form of the invention.

While the invention is susceptible of embodiment in many different forms, we have shown in the drawings and shall herein describe in detail a preferred form, together with a modification, with the understanding that the present disclosure is to be considered as an exemplification of the principles of the invention and is not intended to limit the invention to the forms shown. The scope of the invention will be pointed out in the appended claims.

In the form selected for purposes of disclosure in Figs. 1 and 2, the invention comprises, as essential elements, a printing unit 20, a driving motor 21, a potentiometer 22, a voltage divider 23, a switch 24 and a plurality of electronic pen actuating circuits, indicated generally at 25, which directly interconnect certain of the above named elements.

In the operation of the invention, variable negative D. C. electrical potentials are impressed at point 26 of the circuit of the present invention. These D. C. potentials are obtained from a source or station 26a, the condition of which is being investigated. The D. C. potentials may be produced by or proportional to changes occurring in detector gauges located at the station, the gauges being connected in rapid and recurring sequence into a circuit which converts the gauge changes into varying negative D. C. potentials, for example, as is disclosed in said copending application Serial No. 549,440. The potentials, however, may be provided by other sources.

The voltage divider 23 is provided to limit the amplitude of the negative voltage being fed into the circuit of the invention for a reason hereinafter stated.

The negative D. C. potentials are led to the switch 24 which comprises a rotating arm 27 and a plurality of contacts 28 adapted to be successively engaged by arm 27. As the rotating arm 27 engages each of the contacts 28 a potential will be fed into the electronic pen actuating circuits 25 which are connected to the contacts. Generally, one contact 28 and associated circuit 25 are provided for each gauge device or signal source, and the switch 24 is operated in synchronism with a similar switch controlling the connection of the gauge devices in circuit to produce the negative D. C. potentials. Each of the electronic circuits 25 includes a condenser 29 and a gas filled electron tube 30 such as a 2051 Thyratron. The potential fed to each electronic circuit 25 will charge the condenser 29 therein to a negative potential equivalent to the strength of the signal being fed. This negative potential will act as a bias on the Thyratron tube 30 to prevent the firing thereof.

The means for effecting the firing of the various Thyratron tubes 30 comprises the potentiometer 22 and a comparison circuit 35 associated therewith. The potentiometer 22 is shown here as having ten stationary contact members 31 and a rotatably supported annular resistance element 33 adapted to move progressively in contact with the members 31 from a grounded or dead spot 32, at the advance end of the resistance 33, across the resistance element 33 to the remote or trailing end thereof. The dead spot of the resistance element is grounded so that the terminals of a condenser 29 will be simultaneously connected to the voltage divider 23 and to ground, thereby completing the condenser circuit as the dead spot 32 engages the condenser connected contact 31, said condenser connected contact 31 being thus connected to ground through the dead spot as the rotating arm 27 engages a condenser connected contact 28 to connect the other side of the condenser 29 with the voltage divider 23. A direct current source 34 is connected to apply a positive voltage to the resistance of the potentiometer. The voltage supplied by source 34 is of a sufficient value to equal the potential passed by divider 23 so that the potentiometer 22 will be capable of passing a potential of sufficient magnitude to counteract the effect of the voltage on condenser 29 in a manner and for a purpose to be described. In the present system the maximum voltage passed by the divider 23 is preferably limited to a value of approximately 40 volts. This value is determined by the characteristics of the Thyratron tubes 30 for a potential must be chosen that can be passed without overheating or damaging the tube.

The movement of the movable potentiometer resistance past the contact members 31 of the potentiometer 22 is mechanically synchronized with the movement of the rotating switch arm 27 and each member 31 is associated with a particular electronic circuit 25 leading from contacts 28. The motor 21 supplies the power for driving the potentiometer resistance across the contact members 31 and for rotating switch arm 27 in step with the signals to be recorded.

The device of the present invention operates by counteracting a negative voltage applied from the source 26 by a uniformly increasing positive voltage supplied from the source 34. The negative potentials supplied through the connection 26 are proportional to changes occurring in measuring gauges, the condition of which is to be noted by the recording unit 20. The negative voltages applied through the connection 26 and the potentiometer 23 are sorted by the rotary switch 24 and applied to the circuits 25 successively so that they may be balanced or measured against the positive voltage supplied to the circuits 25 from the source 34 through the rotary potentiometer 22, which is operated in unison with the switch 24.

The positive potential from the source 34 uniformly increases during the rotary cycle of the potentiometer 22. Each condenser 29 is thus substantially negative at the beginning of the rotary cycle of the potentiometer 22, but the negative condition of such condenser 29 decreases during the rotation of the potentiometer 22 until it reaches the point at which the associated thyratron 30 will fire. Since the initial negative condition of the condenser 29 is determined by the value of potential applied thereto through the connection 26, it will be obvious that the thyratron will fire after a time delay interval equal to the magnitude of negative potential applied through the connection 26. This is for the reason that the counterbalancing positive potential is increased at a substantially uniform rate of speed through the action of the potentiometer 22. As a consequence, the negative potential supplied through the connection 26 will be counterbalanced to the degree necessary for the firing of the thyratron after a time delay, which is proportional to the magnitude of such negative potential to be measured and recorded.

The device, thus, serves to accurately measure the intensity of the potentials delivered through the connection 26 and utilizes such measured magnitude for the actuation of the recorder 20 through the operation of the thyratron tubes 30.

To better illustrate the operation of the various parts, one circuit numbered 25a will be traced; this circuit will include the contact 28a in the switch 24, contact 31a in potentiometer 22, a condenser 29a, and a Thyratron tube 30a. Thus in circuit 25a, with the movement of the switch arm 27 to contact 28a, the condenser 29a associated therewith will be charged to a potential equivalent to the potential sent from the impulse source. Movement of arm 27 from the contact 28a will disassociate the condenser 29a from the impulse source and, at this same instant, the grounded section 32 of the potentiometer will move away from the contact 31a and the resistance unit 33 will commence to traverse the contact 31a from the grounded section 32 of the potentiometer 22 toward the positive end thereof. The gas filled Thyratron tube 30a will pass current only after the grid potential thereof reaches a voltage determined by the characteristics of the tube and which in this instance, for sake of illustration, will be assumed to be a value of $-2$ volts. In circuit 25a it will also be assumed that there has been impressed upon the condenser 29a, by the signal from the impulse source entering circuit 25a, a potential of $-10$ volts. When the potentiometer resistance has moved across contact 31a a sufficient distance to produce a voltage of $+8$ volts on contact 31a the effect of the negative charge on the condenser 29a will be neutralized and the Thyratron tube 30a will ignite to pass current for a purpose to be described.

During the period that a negative charge exists on condenser 29a sufficient to bias the Thyratron 30a against firing, a potential is being built up on a second condenser 37a located in the circuit 25a. A battery 38 supplies a regulated D. C. potential impressed upon condenser 37a and as here used has a capacity of 150 volts. However, the potential required here may be supplied from any D. C. source. A pair of resistances 39a and 40a are associated with the condenser 37a and battery 38. Resistance 40a has a resistance many times greater than the resistance 30a and hence will control the charging rate of the condenser 37a. The resistance 39a thus acts to pass the charging current of condenser 37a around, or in shunt with, the paper on which charts are laid out. When Thyratron tube 30a fires, it will cause condenser 37a to discharge and pass a current into a pen circuit 3 to cause a mark to be made through pen 41a on a special paper R used with this invention. Therefore, Thyratron tube 30a, in effect, acts as a trigger or relay. The condenser 37a cannot discharge till Thyratron tube 30a fires and completes the discharge circuit or condenser 37a by grounding the upper side of the condenser through the tube, the lower side of the condenser being connected through pen circuit 3', pen 41a and metal roller 42 to ground at 42a. Therefore, the position of the mark made on the paper R with respect to the extremes of each chart will have a direct relation to the potential impressed on condenser 29a from the impulse source; and this position, therefore, will indicate the potential produced by the signal being investigated.

Each of the other electronic circuits 25 will operate in a manner similar to circuit 25a just described and each will have elements therein similar to pen operating condenser 37a and resistances 39a and 40a and these elements will be numbered respectively 37, 39 and 40. The battery 38 is common to all of the various condensers 37, supplying the charge to each.

The printing unit 20, as shown herein in Figs. 1 and 2, includes a pair of metallic rollers 42 over which is passed a special type of paper R, known commercially as Teledetos paper, and which reacts to a passage of current therethrough to leave a mark at the point through which current is passed. A plurality of contact strips or trolleys 1 to 10 inclusive, of equal length, are fixed relative to the metallic rollers 42 and each of the troleys 1 to 10 is connected into its particular electronic circuit 25. Leads 1' through 10' effect the connections between ten electronic circuits 25 and the trolleys 1 to 10. A pen assembly 44 is located between the metallic rollers 42 and comprises two drive sprockets 45 and 46 and an endless belt 47, having thereon thirteen equally spaced pens 41, with ten of the pens being active at one time. The motor 21 which drives the potentiometer 22 and the switch 24 also drives the pen assembly 44 through suitable gearing 44'.

In the perspective illustration (Fig. 2) triangular shaped styli 48 are shown movable upon a pair of associated rods 48a. These styli are used to mark the zero points on the various charts to correspond to the zero points of the matching detector gauges.

It is readily seen that the various pens 41 will not operate simultaneously to mark the second sheet, but that their moment of marking the sheet is dependent on the time that the condensers 37 discharge, and the discharging of the condensers 37 is dependent upon the firing of the Thyratron tubes 30 which act in effect as triggers. The time of operation of the various Thyratron tubes 30 will be, as described, dependent on the magnitude of the negative potentials impressed on the condensers 29 by action of the switch 24. It is likely that the potentials received from various impulse sources and fed into the various circuits 25 by the switch 24 will have different magnitudes. The pens 41 will then move along the various trolleys 1 to 10 and no pen 41 will operate to mark the sheet until a charge is received from the condenser 37 associated with the particular trolley on which the pen happens to be riding. Thus with ten pens 41 riding on trolleys it is readily seen that each of the pens 41 can operate to mark the record sheet at different times, dependent on the moment that the Thyratron tube 30 for each circuit fires.

The paper passing over the metallic rollers 42 is divided, as shown, in to a plurality of charts of the width of the trolleys. Each of the pens 41 is adapted to act on each of the charts in the course of its movement past each chart, for as one pen 41 accepts the charge from a condenser 37 associated with the trolley on which it is riding to effect a mark on the chart adjacent that trolley, a new impulse from the same source will have been fed into the same circuit by switch 24 by the time the next pen arrives at this trolley and a new charge will be passed to this pen when the associated contact 31 of the potentiometer has moved a sufficient distance to produce a potential capable of neutralizing the new impulse to thereby permit the associated Thyratron tube 30 to operate again and pass another charge from condenser 37. It is here noted that the movement of the potentiometer across contacts 31 is directly related to the movement of the pens 41, for as a pen 41 arrives at a particular trolley the corresponding contact 31 (associated with that trolley) will move from the grounded portion of the potentiometer in a direction to produce a counteracting voltage on the corresponding tube 30, as described above.

It should be noted that the relationship a pen 41 bears to the trolley on which it is riding at a particular moment will not be the same relationship that the other pens in the system bear to the trolleys on which they are riding. In the ten-chart unit in which the invention has been embodied herein, there will be ten contacts 31 provided in the potentiometer 22, one for each of the electronic circuits 25; and a grounded dead spot 32 will occupy one-tenth of the length of the potentiometer. The potentiometer 22 will be assumed to be operated at such a speed that it will take one second for it to traverse a contact and to return back to any particular point. There being ten contacts 31 embodied in the potentiometer 22, the grounded end 32 of the resistance unit 33 will pass adjacent contacts 31 at intervals of one-tenth of a second. Thus, the grounded section 32, after passing and thus disengaging a particular contact 31a, will not pass or disengage the next adjacent contact 31b until one-tenth of a second later. Because each contact 31 will be in engagement with the live portion of the resistance unit 33 during a time interval of nine-tenths of a second, the movement of each pen 41 will be such that it will take a pen nine-tenths of a second to travel from one extremity to the other of a trolley. The pens 41 are spaced apart on the belt 47 a distance greater than the length of a trolley. Thus, if the pen on trolley 3 has arrived at the end of its trolley, the pen on trolley 4 will therefore be one-tenth of a second from the end thereof, and the next pen, which is on trolley 5, will have to travel two-tenths of a second more upon its trolley. Thus there is one-tenth of a second difference, in the amount of time a pen has ridden on a trolley, between each adjacent pen. This difference in time of travel between each pen is effected to bring the pens into correlation with the disengagement of the grounded section 32 of the potentiometer 22, from the successive contacts 31. To insure that each of the pens 41 arrives at the zero point or starting end of a trolley just as the line portion of the potentiometer engages a contact 31 associated with that trolley, the one-tenth of a second spacing between the contacts 31 is carried over to the spacing of the pens 41. To arrange for the pens to arrive in this manner the trolleys have been spaced apart a distance equal to one-tenth of a second's movement of the belt. During the interval a pen passes from one trolley to the next, the grounded section 32 of the potentiometer is traversing the corresponding contact 31.

If the invention were to be embodied in a device having a larger number of charts there will be changes in the time factors involved. For example, in an 80 chart device the potentiometer 22 will have 80 contacts 31 and the contacts 31 will follow each other onto the live portion one-eightieth of a second apart and this difference of one-eightieth of a second will be carried to the pens 41 and the trolleys, and each pen 41 will arrive at a trolley one-eightieth of a second later than the pen adjacent to it arrived at its trolley.

It is a feature of this invention that a potential, the duration of which is extremely short, that is, of the order of a few milliseconds, can be noted and an indication made thereof at a determined point for investigation. In the form of the invention herein described it has been shown how the potential received will be stored until the various mechanical elements of the system have had sufficient time to move in their defined paths to measure and effect an indication of the impulse. It has also been shown that this indication will be directly related to the value of the stored potential. In the present embodiment of the invention the pens are adapted to move at a rate of approximately six inches per second.

It is here also noted that though a plurality of detector gauges are being investigated the impulses from these stations will come to the embodiment of the invention over a single channel and in consecutive order, being impressed at point 26, from which point the various impulses are fed into various electronic circuits 25 but with all the impulses put out from a particular station being fed into the same electronic circuit.

A modification of the invention is schematically illustrated in Fig. 3. In this modification a synchronous motor 49 is provided for driving the scanning switch 24 and effecting the movement of the pens 41 across the charts so as to have these movements at a constant rate. This modification is similar in all respects to the embodiment described above except that another means for neutralizing the hold off bias on the Thyratron tubes 30 has been substituted for the potentiometer 22. This means comprises time delay circuits shown at 50, one of which is embodied in each of the electronic circuits 25. Each circuit 50 includes a resistor 51 and a condenser 52, connected in parallel. The potentials provided by the impulse source 23 are fed by switch 24 into the various electronic circuits 25 and these potentials are, in turn, impressed upon the condensers 52. Each charge will leak off through the associated resistance 51 until it reaches a certain minimum value at which the bias is removed from the associated Thyratron tube 30 and the tube may operate as a trigger or relay, as in the preferred embodiment of Fig. 1. This effects a discharge of the condenser 37 associated therewith. The time constants involved in this modification are not linear, as in the preferred embodiment described above with its rotating potentiometer 22.

For ease of presentation the invention has been shown as a 10 chart unit with the potentiometer of Fig. 1 having 10 contacts 31 and the switch 24 having 10 contacts to each of which an electronic circuit 25 can be connected. An actual physical embodiment of the invention has used a potentiometer and a scanning switch 24 of sufficient size that eighty pens could be controlled. When eighty pens are used, eight of the printing units 20 are combined in an apparatus and the proper electrical leads are attached. However, the individual pen assemblies may change in the following respect: The number of pens 41 on the various belts of an 80 chart device may be different than the number of pens 41 on a belt used in a 10 chart unit. As stated above, the 10 chart unit used included a belt carrying thirteen equally spaced pens; the 80 chart embodiment will employ a belt carrying twelve equally spaced pens. In the 10 chart unit the various pens were so spaced as to effect a tenth of a second difference between pens, and this will require the pens to be spaced closer than in the 80 chart device where there was a one-eightieth of a second difference between pens. Thus, in an 80 chart device, if the pen associated with trolley 3 should be at the end of its trolley, the pen on trolley 4 will be only one-eightieth from the end of its trolley, and it is obvious that the distance between these two pens will be seventy-nine eightieths of the distance between corresponding points on two adjacent trolleys, and, therefore, a distance apart greater than the distance between similar adjacent pens in a 10 chart unit. This greater spacing, together with a judicious locating of the centers of the pulleys, can eliminate a pen. It is emphasized that the number of pens 41 on a belt forms no part of this invention; in a 10 chart unit the number may be more than the thirteen pens shown; similarly, in an 80 chart device there may be more than twelve pens, because the pulleys may be larger in size and therefore sufficient pens must be added to care for traveling around the pulleys. What is important, however, is to have a sufficient number of pens properly arranged around a belt so that a pen will arrive at a trolley just as the potentiometer contact 31 associated with that trolley reaches the live portion of the potentiometer. The number of pens in excess of the number of trolleys required is then merely a matter of mechanical expediency.

It is thought that the invention and its numerous attendant advantages will be fully understood from the foregoing description; and it is obvious that numerous changes may be made in the form, construction and arrangement of the several parts without departing from the spirit or scope of the invention, or sacrificing its attendant advantages, the form herein disclosed being a preferred embodiment for the purpose of demonstrating the invention; and we do not claim herein either the patentable combinations including specific means for controlling the production of high frequency oscillations in the transmitting system or of the transmitting system itself, the same being claimed in a co-pending application Serial No. 535,481; nor the patentable combination embodying particular features of the receiver and recorder mechanism, or the manner of operating the same, as claimed in a co-pending application Serial No. 549,440; nor the combination forming a telemetric system including a plurality of sending stations and the means of operating the same, as claimed in a co-pending application Serial No. 549,442, Patent Number 2,466,803, issued April 12, 1949; nor the combination embodying specific means for accomplishing the frequency variation of signal impulses in repeated succession and the manner of so operating a telemetric system, as claimed in a co-pending application Serial No. 549,443, Patent Number 2,466,804, issued April 12, 1949;

We claim as our invention:

1. A recording apparatus for a telemetering system comprising, in combination, means for supporting and advancing a plurality of record sheets, means for supporting marking devices and continuously advancing said devices at a uniform rate transversely of said record sheets, a marking device energizing member adjacent each record sheet position and engageable by the marking devices as they pass across an associated sheet, a signal measuring circuit connected to each of said members, a scanning switch for distributing the incoming signals in continuous rotation to said measuring circuits, each of said measuring circuits comprising a discharge tube having a control grid, means for supplying to said grid a negative bias proportional to the magnitude of the signal, means for producing a positive potential increasing proportionally to the movement of said marking devices from one end to the other of said energizing member, said positive potential being arranged to oppose said negative grid bias whereby, after a time interval, depending upon the magnitude of the signal, the negative grid bias is overcome and said tube is made conducting, and means operable when the tube is made conducting to cause a marking device to mark the corresponding record sheet to indicate the magnitude of said signal.

2. A recording apparatus for a telemetering system comprising, in combination, means for supporting and advancing a plurality of record sheets, means for supporting marking devices and continuously advancing said devices at a uniform rate transversely of said record sheets, a marking device energizing member adjacent each record sheet position and engageable by the marking devices as they pass across an associated sheet, a signal measuring circuit connected to each of said members, a scanning switch for distributing the incoming signals in continuous rotation to said measuring circuits, each of said measuring circuits comprising a condenser for storing potentials corresponding to the signals to be recorded, a resistance in parallel with said condenser and through which the condenser discharges, a gas-filled discharge tube which becomes conductive when the condenser has reached a predetermined state of discharge, and means operable when said tube becomes conductive to cause a marking device to mark the corresponding record sheet to indicate the magnitude of said signal.

3. A recording apparatus for periodically received variable voltage signals comprising, in combination, means for supporting and advancing a record sheet, means for supporting a marking device and continuously advancing said device at a uniform rate transversely of said record sheet, a signal measuring circuit connected to said marking device, said measuring circuit being actuated by the magnitude of the signal received, whereby the time of actuation depends on said magnitude, and comprising a condenser for temporarily storing the signals to be recorded, a resistance in parallel with said condenser and through which the condenser discharges, a gas filled discharge tube which becomes conductive when the condenser has reached a predetermined state of discharge, and means operable at the time when said tube becomes conductive to cause a marking device to mark the record sheet.

4. A recording apparatus for periodically received variable voltage signals, comprising means for supporting record sheet means, means for moving said record sheet means at a substantially uniform rate of speed over the supporting means, a marking device movable at regulated speed transversely across said record sheet means, signal measuring means comprising storage means for temporarily storing energy of magnitude proportional to the voltage of the signal to be recorded, trigger means normally held inactive by said stored energy, means for dissipating said energy at a selected rate, to thereby release said trigger means after a time delay interval, following initial storage of the energy in the storage means, proportional to the magnitude of the stored energy, whereby to measure the stored energy in terms of said time delay interval, and means operable in response to release of said trigger means for actuating said marking device to mark the record sheet means.

5. A recording apparatus for periodically received variable voltage signals, comprising means for supporting record sheet means, means for moving said record sheet means at a substantially uniform rate of speed over the supporting means, a marking device movable at regulated speed transversely across said record sheet means, signal measuring means comprising a condenser for temporarily storing an electrical energy charge of magnitude proportional to the voltage of the signal to be recorded, trigger means normally held inactive by said electrical energy charge, means for dissipating said energy charge at a selected rate, to thereby release said trigger means after a time delay interval, following initial storage of the energy charge in said condenser, proportional to the magnitude of the stored charge, whereby to measure the stored energy charge in terms of said time delay interval, and means operable in response to release of said trigger means to actuate said marking device to mark the record sheet means.

6. A recording apparatus for periodically received variable voltage signals, comprising means for supporting record sheet means, means for moving said record sheet means at a substantially uniform rate of speed over the supporting means, a marking device movable at regulated speed transversely across said record sheet means, signal measuring means comprising a condenser for temporarily storing an electrical energy charge of magnitude proportional to the voltage of the signal to be recorded, a gas filled electron discharge tube normally held inactive by said electrical energy charge, means for dissipating said energy charge at a selected rate, to thereby release said gas filled electron discharge tube after a time delay interval, following initial storage of the energy charge in said condenser, proportional to the magnitude of the stored charge, whereby to measure the stored energy charge in terms of said time delay interval, and means operable in response to release of said gas filled electron discharge tube to actuate said marking device to mark the record sheet means.

7. A recording apparatus for periodically received variable voltage signals, comprising means for supporting record sheet means, means for moving said record sheet means at a substantially uniform rate of speed over the supporting means, a marking device movable at regulated speed transversely across said record sheet means, signal measuring means comprising a condenser for temporarily storing an electrical energy charge of magnitude proportional to the voltage of the signal to be recorded, trigger means normally held inactive by said electrical energy charge, resistance means for dissipating said energy charge at a selected rate, to thereby release said trigger means after a time delay interval, following initial storage of the energy charge in said condenser, proportional to the magnitude of the stored charge, whereby to measure the stored energy charge in terms of said time delay interval, and means operable in response to release of said trigger means to actuate said marking device to mark the record sheet means.

8. A recording apparatus for periodically received variable voltage signals, comprising means for supporting record sheet means, means for moving said record sheet means at a substantially uniform rate of speed over the supporting means, a marking device movable at regulated speed transversely across said record sheet means, signal measuring means comprising a condenser for temporarily storing an electrical energy charge of magnitude proportional to the voltage of the signal to be recorded, trigger means normally held inactive by said electrical energy charge, resistance means in parallel relation with said condenser for dissipating said energy charge at a selected rate, to thereby release said trigger means after a time delay interval, following initial storage of the energy charge in said condenser, proportional to the magnitude of the stored charge, whereby to measure the stored energy charge in terms of said time delay interval, and means operable in response to release of said trigger means to actuate said marking device to mark the record sheet means.

9. A recording apparatus for periodically received variable voltage signals, comprising means for supporting record sheet means, means for moving said record sheet means at a substantially uniform rate of speed over the supporting means, a marking device movable at regulated speed transversely across said record sheet means, signal measuring means comprising a condenser for temporarily storing an electrical energy charge of magnitude proportional to the voltage of the signal to be recorded, trigger means normally held inactive by said electrical energy charge, a potentiometer driven at regulated speed to apply progressively increasing charge neutralizing electrical potential to said condenser for dissipating said energy charge at a selected rate, to thereby release said trigger means after a time delay interval, following initial storage of the energy charge in said condenser, proportional to the magnitude of the stored charge, whereby to measure the stored energy charge in terms of said time delay interval, and means operable in response to release of said trigger means to actuate said marking device to mark the record sheet means.

10. A recording apparatus for periodically received variable voltage signals, comprising means for supporting and moving record sheet means longitudinally thereof, a plurality of marking devices movable in spaced succession and at regulated speed transversely across said record sheet means, signal measuring means comprising storage means for temporarily storing energy of magnitude proportional to the voltage of the signal to be recorded, means operable to apply said energy initially on said storage means as a said marking device reaches a datum position with respect to the sheet means, trigger means normally held inactive by said stored energy, means for dissipating said energy at a selected rate, to thereby release said trigger means after a time delay interval, following initial storage of the energy in the storage means, proportional to the magnitude of the stored charge, whereby to measure the stored energy in terms of said time delay interval, and means operable in response to release of said trigger means to actuate said marking device to mark the record sheet means at a distance from the datum position proportional to the magnitude of said stored energy.

11. A recording apparatus for successively received variable voltage signals, comprising means for supporting and moving a plurality of record sheets longitudinally thereof, each signal to be recorded having a corresponding record sheet, a plurality of marking devices movable in spaced succession and at regulated speed transversely across the several record sheets, signal measuring means comprising a measuring circuit for each of the voltage signals to be recorded, distributor means for applying energy of magnitude proportional to the voltage of said signals to be recorded successively to said circuits as marking devices reach datum positions with respect to the corresponding record sheets, each measuring circuit comprising storage means for temporarily storing the energy applied thereto, trigger means normally held inactive by said stored energy, means for dissipating said energy at a selected rate, to thereby release said trigger means after a time delay interval, following initial storage of the energy in the storage means, proportional to the magnitude of the stored charge, whereby to measure the stored energy in terms of said time delay interval, and means operable in response to release of said trigger means to actuate the corresponding marking device to mark the corresponding record sheet means at a distance from the datum position proportional to the magnitude of said stored energy.

12. A recording apparatus comprising, in combination, a support for a record sheet, means for moving a record sheet at a substantially uniform rate over said support, a marking device, means for moving said marking device at a uniform rate transversely across the record sheet on said support, a circuit electrically connected to said marking device, means for connecting said circuit to a signal source to receive signals to be recorded, said circuit comprising a source of current, a discharge tube having a control grid, means for supplying to said grid a negative bias proportional to the magnitude of the signal received, means for producing a positive potential increasing proportionally to the movement of said marking device from one end to the other of said record sheet, said positive potential being arranged to oppose said negative grid bias whereby, after a time interval dependent upon the magnitude of the signal, the negative grid bias is overcome and said tube is made conducting, and means controlled by said tube, operable when the tube is made conducting to cause the marking device to mark the record sheet at the end of said time interval, the position of the mark on said record sheet being an indication of the magnitude of said signal.

13. A recording apparatus for a high speed telemetric system comprising, in combination, means for supporting record sheets comprising a pair of laterally spaced and parallel supports over which the sheets pass, means for moving the record sheets at a substantially uniform rate, a plurality of marking devices, means for moving said devices at a uniform rate transversely across the record sheets comprising a pair of wheels supported on spaced apart axes and a belt traveling on said wheels and carrying said marking devices, a plurality of energizing trolleys located one adjacent to each record sheet position for engagement by a marking device as it passes the position, a plurality of circuits, one circuit provided for electrical connection to each of said trolleys, a scanning switch for distributing incoming signals to be recorded in continuous rotation to said circuits, each of said circuits comprising means controlled in accordance with the magnitude of the signal received and adapted to function at a time subsequent to the receipt of a signal, which time is dependent upon said magnitude and is measured from the time a marking device leaves the advance edge of a record sheet, and means in each circuit under control of said last named means for causing the energization of the associated trolley upon the functioning of said last named means, energization of a trolley causing a marking device in engagement therewith to mark the adjacent record sheet.

14. A recording apparatus for a high speed telemetric system comprising, in combination, means for supporting record sheets comprising a pair of laterally spaced and parallel supports over which the sheets pass, means for moving the record sheets at a substantially uniform rate, a plurality of marking devices, means for moving said devices at a uniform rate transversely across the record sheets, a plurality of circuits, one for each of said marking devices, a scanning switch for distributing incoming signals to be recorded in continuous rotation to said circuits, each of said circuits comprising means controlled in accordance with the magnitude of the signal to be recorded and adapted to function at a time subsequent to the receipt of a signal, which time is dependent upon said magnitude and is measured from the time a marking device leaves the advance edge of a record sheet, and means in each circuit under control of said last named means for causing the energization of the associated marking device upon the functioning of said last named means, energization of a marking device causing a mark on the adjacent record sheet.

15. A recording apparatus comprising, in combination, means for supporting and advancing a record sheet, marking devices, means for supporting and continuously advancing said marking devices at a uniform rate and one at a time transversely of the record sheet, a marking device energizing trolley adjacent the record sheet position and engageable by the marking devices as they pass across the sheet, a circuit electrically connected to said trolley and connected to a signal source to receive incoming signals to be recorded, said circuit comprising a source of current, a discharge tube having a control grid, means for supplying to said grid a negative bias proportional to the magnitude of the signal received, means for producing a positive potential increasing proportionally to the movement of a marking device from one end to the other of said trolley, said positive potential being arranged to oppose said negative grid bias whereby after a time interval dependent upon the magnitude of the signal, the negative grid bias is overcome and said tube is made conducting, and means controlled by said tube, operable when the tube is made conducting to cause a marking device to mark the record sheet at the end of said time interval, the position of the mark on said record sheet being an indication of the magnitude of said signal.

16. A recording apparatus for a telemetering system comprising, in combination, means for supporting and advancing record sheets, a plurality of marking devices, means for supporting and continuously advancing said marking devices at a uniform rate transversely of the record sheets, a marking device energizing member adjacent each record sheet position and engageable by the marking devices as they pass across an associated sheet, a plurality of circuits, one circuit provided for electrical connection to each of said energizing members, a scanning switch for distributing incoming signals in continuous rotation to said circuits, each of said circuits comprising a gas filled tube having a grid, anode and cathode electrodes, a condenser and a resistor connected in parallel between said grid and cathode electrodes and periodically charged by a unidirectional voltage proportional to the magnitude of the signal to be recorded, said condenser discharging through said resistor during noncharging intervals, the polarity of the charge on said condenser being such that said tube is nonconductive so long as said charge exceeds a predetermined value, and means under the control of said tube, operable upon the break-down of said tube after a time interval dependent upon the magnitude of the signal, to cause a marking device to mark the corresponding record sheet and thereby indicate the amplitude of said voltages as a function of the time required for said condenser to discharge to said predetermined value during each of said non-charging intervals.

17. A recording apparatus for a telemetric system comprising, in combination, means for supporting and moving record sheets at a substantially uniform rate comprising a support over which the sheets pass, a plurality of marking devices, means for supporting and moving said marking devices at a uniform rate transversely across the record sheets on said support, a plurality of energizing members located one adjacent to each record sheet position for engagement by a marking device as it passes that position, a plurality of circuits, one for each energizing member, means for successively connecting each of said circuits to receive incoming variable magnitude signals to be recorded, each of said circuits comprising means controlled in accordance with the magnitude of the signal to be recorded and adapted to function at a time subsequent to the receipt of a signal, which time is dependent upon said magnitude, and means controllable by said last named means for energizing said energizing member to cause a marking device to mark a record sheet at the end of said time interval.

18. A recording apparatus for use in a telemetering system, comprising chart supporting means and chart moving means, a plurality of chart marking devices, means for moving said devices continuously in a path transversely of the movement of said charts, a plurality of circuits, one for each chart marking device, means for successively connecting each of said circuits to receive the signals to be recorded, each of said circuits comprising means controlled in accordance with the magnitude of the signal received to cause it to function at a time subsequent to the receipt of the signal and in which the time is dependent on said magnitude, and means under the control of said last named means, operable to cause said chart marking devices to function at the end of such time intervals.

19. A recording apparatus for a high speed telemetric system comprising, in combination, means for supporting and moving record sheets at a substantially uniform rate, a plurality of marking devices, means for supporting said devices and continuously advancing them across the record sheets, a plurality of circuits, one for each marking device, a scanning switch for connecting said circuits in rapid and repeated sequence to receive incoming signals to be recorded, a circuit connected to said plurality of circuits and comprising a potentiometer resistance, a source of unidirectional current connected to said resistance and a plurality of potentiometer contacts engageable with said resistance, one contact for each of said plurality of circuits, means for moving said potentiometer resistance across said contacts in timed relation to said scanning switch so that the contact for each circuit engages the negative end of the potentiometer after that circuit receives an incoming signal from the scanning switch, a condenser in each of said circuits chargeable by the incoming signal, a gas-filled tube in each circuit rendered non-conductive by the charge on the condenser, means for producing a positive potential increasing proportionally to the movement of a marking device across a record sheet, which positive potential is applied to the tube, said tube being rendered non-conductive until the corresponding contact has reached a point on the potentiometer resistance at which said positive voltage neutralizes the signal charge on the condenser, a second condenser in each circuit, means for charging such condensers, said second condenser being arranged to discharge when the tube is made conductive to cause a marking device to place a mark on a corresponding record sheet.

20. A recording apparatus for a high speed telemetric system comprising, in combination, means for supporting and moving record sheets at a substantially uniform rate comprising a pair of laterally spaced and parallel rollers, a plurality of marking devices, means for supporting and moving said marking devices at a uniform rate transversely of record sheets on said rollers comprising a pair of wheels and a belt traveling on said wheels and carrying said marking devices, a plurality of energizing trolleys located one adjacent to each record sheet position for engagement by a marking device as it passes that position, a plurality of circuits, one electrically connected to each trolley, a scanning switch for connecting said circuits in rapid and repeated sequence to receive incoming signals to be recorded, a circuit connected to said plurality of circuits and comprising a potentiometer resistance, a direct current source connected to said resistance and a plurality of potentiometer contacts engageable with said resistance, one contact being provided for each of said plurality of circuits, means for moving said potentiometer resistance across said contacts in timed relation to said scanning switch so that the contact for a circuit engages the negative end of the potentiometer shortly after receiving an incoming signal from the scanning switch, a condenser in each of said circuits chargeable by the incoming signal, a gas-filled tube in each circuit rendered non-conductive by the charge on said condenser, means for producing a positive potential increasing proportionally to the movement of said marking devices from one end to the other of said trolleys, which positive potential is applied to the tube, said tube remaining non-conductive until the corresponding contact has reached a point on the potentiometer resistance where the positive voltage substantially neutralizes the charge on the condenser, a second condenser in each analyzing circuit, means for charging such condensers, said second condenser being arranged to discharge when the tube is made conductive to cause a marking device to place a mark on a corresponding record sheet.

HARVEY D. GIFFEN.
THOMAS B. THOMSON, Jr.

REFERENCES CITED

The following references are of record in the file of this patent:

UNITED STATES PATENTS

| Number | Name | Date |
| --- | --- | --- |
| 907,235 | Herrick | Dec. 22, 1908 |
| 1,641,199 | Roucka | Sept. 6, 1927 |
| 2,141,974 | Finch | Dec. 27, 1938 |
| 2,228,883 | Morgan | Jan. 14, 1941 |
| 2,306,391 | Keinath | Dec. 29, 1942 |